Rx9906

Rel. doc x 3643

Aug. 10, 1836

UNITED STATES PATENT OFFICE.

AZA ARNOLD, OF NORTH PROVIDENCE, RHODE ISLAND.

DOUBLE-SPEEDER.

Specification forming part of Letters Patent No. 11, dated January 21, 1823; Reissued August 10, 1836.

*To all whom it may concern:*

Be it known that I, AZA ARNOLD, of North Providence, in the county of Providence and State of Rhode Island, have invented a new and useful Improvement in Cotton-Roving Machines, called the "Double-Speeder," which improvement consists in applying a certain combination of wheels to produce the proper motion for winding the roving upon the spools.

Said combination is composed of several wheels connected in such a manner (hereinafter described) that the first and second operate immediately on the third without affecting each other, so that if the first be put in motion it moves the third although the second remains still, and if the second be put in motion it moves the third although the first be still, then if the first and second move together it moves the third with the accumulated motion of both; and further, if the first and second move in opposite directions then the third turns on its own axis, which axis moves only by the difference of their two velocities. This may be called a differential or compound motion, for the effect is either to add two motions together or to subtract one from the other as the case may require, and it is equally applicable to the "double speeder" one way as the other. I have applied it both ways.

The "double speeder" is too well known to require any particular description. It may be proper first to state that the "double speeder," is a machine that makes the roving and winds it on the spools; it draws the cotton by a system of rollers similar to that of Arkwright's roving can-frame, but unlike that it has no cans to receive the roving, but has fliers to twist and wind the roving upon the spools: the "double speeder," requires three motions essentially different from each other, one is a uniform motion of the fliers, rollers, &c. Another must be a retarded motion for the vertical movement of the spools, while the third may be an accelerated motion for the rotary movement of the spools, or it may be another retarded motion. Suppose the vertical reciprocating motion of the spools required to be reduced from four vibrations per minute by degrees to one vibration per minute; the reason of this change will appear from the nature of the operation required, for the rising and falling of the spool causes the roving to be wound from top to bottom and vice versa; then as the diameter of the spool is enlarged by each successive layer of roving the motion should be reduced in the same proportion, otherwise the roving would not be wound equally close, and while the flier revolves with uniform velocity, say twenty revolutions per given time the spool should vary (during the time of being filled) from sixteen to nineteen turns; so that when the roving is winding on the bare spool the flier turning twenty and the spool sixteen times gives the roving four turns around the spool; but when the spool is near full and is four times as big in diameter it will require four times as much length of roving to reach around it, therefore it is proper that it should turn nineteen times while the flier turns twenty, giving one turn of roving around the spool only. Since the same cause that requires one variation requires the other also, it appears that their differentials should correspond; the enlargement of the spool requires that one motion should be reduced lest the roving should not be wound equally close, and requires that the other should be accelerated lest the roving should be broken. Now if this retarded motion be added in just proportion continually to the uniform motion of the fliers it gives a retarded motion compounded of the two whose differential is the same, and if deducted continually from the motion of the flier it gives an accelerated motion whose differential is the same.

The foregoing is not given as a rule for any one kind of roving, but is taken merely for illustration, the motions should be calculated according to the fineness of the roving required. The mechanical construction of said combination the application of which I claim as my improvement, is described as follows, viz: Two face wheels (bevels) are fitted loosely on a shaft at such distance apart as to admit a pinion to gear into both at once; this pinion is placed on an arm of the same shaft or piece of metal placed on the shaft, between them and projecting a little beyond their circumference; both wheels may be loose on the shaft and and kept in place by collars secured against them. Now as the teeth of the pinion take hold of, the teeth of, both wheels and it is at liberty to turn on its own axis, if one wheel turns it turns the pinion on its axis and if the other wheel be still then the pinion carries the arm and shaft around in the same direction with the wheel, and if both wheels move in one direction the pinion carries the arm and shaft with the power of both. These three wheels constitute the essential parts of the combination and with proper shaft and bearings are capable of all the operations before stated. I claim no exclusive right to this combination except when applied to the "double speeder." Should it be found applicable to other machines this patent is not to prohibit such application. In applying this to the speeder some intermediate parts are required, the invention of which I do not claim and which any skilful mechanic can supply.

The speeder may be in the usual form in all respects except in having but one cone motion (graduated motion produced by cone and belt) instead of two as formerly used; having one uniform motion and one proper retarded motion, the next object is to connect them so as to produce the accelerated motion, or another retarded motion suitable for the spools; the most convenient mode of doing this is to have a spur wheel secured on the back of each bevel of equal diameter and a similar wheel of twice the diameter fastened on the shaft; thus furnished the shaft presents three spur wheels whose velocities are reciprocally equal on the circumference one of them may receive uniform motion by a similar wheel on the main shaft of the speeder and another may receive a graduated motion by any suitable wheels from the cone motion, then the third will give the other motion required for the spools; it is not important which of these graduated motions is produced by the cone for if either be taken and connected in proper proportion with the uniform motion of the flier it will give the other motion required; neither is it important whether the bevels are both loose on the shaft for one may be fast and in that case the arm that supports the pinion should be a radius to the large spur wheel and it should be loose on the shaft then the effect will be the same as before stated.

What I claim as my improvement and what I wish to secure is—

The application of this "differential" or compound motion (produced by these wheels herein described) to the "double speeder" in all or any of the forms of the double speeder by whatever machinery gearing or other mechanical means the application is made or may be made.

AZA ARNOLD.

Witnesses:
NATHL. G. B. DEXTER,
DANIEL WILKINSON.

[FIRST PRINTED 1914.]